US011321781B1

(12) United States Patent
Standard

(10) Patent No.: US 11,321,781 B1
(45) Date of Patent: May 3, 2022

(54) SYSTEM AND A METHOD FOR FACILITATING FINANCIAL PLANNING

(71) Applicant: Bottomline Technologies, Inc., Portsmouth, NH (US)

(72) Inventor: Seona Standard, Needham, MA (US)

(73) Assignee: Bottomline Technologies, Inc., Portsmouth, NH (US)

( * ) Notice: Subject to any disclaimer, the term of this patent is extended or adjusted under 35 U.S.C. 154(b) by 8 days.

(21) Appl. No.: 17/199,128

(22) Filed: Mar. 11, 2021

(51) Int. Cl.
*G06Q 40/06* (2012.01)
*G06F 3/04845* (2022.01)
*G06F 3/04847* (2022.01)
*G06T 11/20* (2006.01)

(52) U.S. Cl.
CPC ......... *G06Q 40/06* (2013.01); *G06F 3/04845* (2013.01); *G06F 3/04847* (2013.01); *G06T 11/206* (2013.01)

(58) Field of Classification Search
None
See application file for complete search history.

(56) References Cited

U.S. PATENT DOCUMENTS

| | | | | |
|---|---|---|---|---|
| 5,918,217 A | * | 6/1999 | Maggioncalda ... | G06Q 30/0601 705/36 R |
| 8,185,463 B1 | * | 5/2012 | Ball ...................... | G06Q 40/06 705/2 |
| 9,043,332 B2 | | 5/2015 | Noel et al. | |
| 9,286,637 B1 | * | 3/2016 | Keld ...................... | G06Q 40/02 |
| 10,810,660 B1 | | 10/2020 | Diggdon et al. | |
| 2002/0138386 A1 | * | 9/2002 | Maggioncalda ....... | G06Q 40/06 705/36 R |
| 2003/0018506 A1 | * | 1/2003 | McLean ................. | G06Q 40/02 705/7.38 |
| 2003/0083984 A1 | * | 5/2003 | Crawford .............. | G06Q 40/00 705/38 |
| 2007/0106520 A1 | * | 5/2007 | Akkiraju ............... | G06Q 10/06 705/348 |
| 2007/0250373 A1 | * | 10/2007 | Ernest ................ | G06Q 10/0637 705/7.11 |

(Continued)

*Primary Examiner* — William L Bashore
*Assistant Examiner* — Nathan K Shrewsbury
(74) *Attorney, Agent, or Firm* — Richard A. Baker, Jr.

(57) ABSTRACT

Disclosed is a system for facilitating financial planning of an objective. The system includes a storage unit for storing computer program instructions, a display unit for displaying processed computer program instructions, a processing unit is coupled to the storage unit and the display unit for processing the computer program instructions. The computer program instructions includes a data input computer program instruction, a data category display computer program instruction, a threshold computer program instruction, a slide computer program instruction and a heat map computer program instruction. The heat map computer program instruction with a color computer program instruction to display the degree of difference with the intensity of the color. A red color to display the degree of difference for a negative value and a green color to display the degree of difference for a positive value. The color computer program instruction displays variation in the intensity of the red or green color based on the degree of difference between the two financial data sets.

18 Claims, 8 Drawing Sheets

(56) References Cited

U.S. PATENT DOCUMENTS

| | | | |
|---|---|---|---|
| 2008/0062177 A1* | 3/2008 | Gaul | G06T 11/206 345/440 |
| 2008/0120121 A1* | 5/2008 | Gilbert | G06Q 10/063 705/7.26 |
| 2009/0307088 A1* | 12/2009 | Littlejohn | G06Q 30/0255 705/14.66 |
| 2010/0088124 A1* | 4/2010 | Diefendorf | G06Q 40/08 705/4 |
| 2010/0198750 A1 | 8/2010 | Ron et al. | |
| 2010/0312603 A1* | 12/2010 | Overman | G06Q 30/0281 705/346 |
| 2012/0271748 A1* | 10/2012 | DiSalvo | G06Q 40/04 705/37 |
| 2014/0006050 A1* | 1/2014 | Feinschreiber | G06Q 40/06 705/2 |
| 2014/0039876 A1* | 2/2014 | Sayers | G06F 40/30 704/9 |
| 2014/0058976 A1* | 2/2014 | Goodrich | G06Q 40/06 705/36 R |
| 2014/0058977 A1* | 2/2014 | Hu | G06Q 40/06 705/36 R |
| 2014/0258176 A1* | 9/2014 | Thorsen | G06Q 40/06 705/36 R |
| 2014/0281993 A1* | 9/2014 | Hyde | H04N 21/47211 715/833 |
| 2014/0317019 A1* | 10/2014 | Papenbrock | G06Q 40/06 705/36 R |
| 2015/0213631 A1* | 7/2015 | Vander Broek | G06T 11/206 345/589 |
| 2015/0348192 A1* | 12/2015 | Broder | G06Q 40/06 705/37 |
| 2017/0132718 A1* | 5/2017 | Fan | G06T 11/206 |
| 2017/0235466 A1* | 8/2017 | Tanwir | G06F 3/0481 715/738 |
| 2018/0158142 A1* | 6/2018 | Gunther | G06Q 40/04 |
| 2019/0114334 A1* | 4/2019 | Gunther | G06F 16/27 |
| 2019/0138571 A1* | 5/2019 | Dimerman | G06F 16/2477 |
| 2019/0172144 A1* | 6/2019 | Creamer | G06Q 40/06 |
| 2019/0205430 A1* | 7/2019 | Huang | G06F 16/489 |
| 2020/0250748 A1* | 8/2020 | Rieger | G06Q 30/012 |
| 2020/0357069 A1* | 11/2020 | Berd | G06Q 40/025 |
| 2021/0019687 A1* | 1/2021 | Fisher | G06Q 10/063114 |
| 2021/0042408 A1* | 2/2021 | Van Dyke | G06F 21/6245 |
| 2021/0097211 A1* | 4/2021 | Beck | G06Q 30/0643 |
| 2021/0287389 A1* | 9/2021 | Shea | G06Q 30/0623 |
| 2021/0295111 A1* | 9/2021 | Campanella | G06V 10/44 |

* cited by examiner

114 ⟶

∨ Inflows

| | Jan 2020 | Feb | Mar | Apr | May | Jun | Jul | Aug | Sep | Oct | Nov | Dec | Total |
|---|---|---|---|---|---|---|---|---|---|---|---|---|---|
| ⟩ Sales & Income ⋯ | 1,500.0 | 1,500.0 | 1,800.0 | 2,800.0 | 1,500.0 | 1,800.0 | 1,600.0 | 1,600.0 | 1,600.0 | 5,000.0 | 1,600.0 | 1,600.0 | 19,200.0 |
| | 1,000.0 | 250.0 | 1,000.0 | 400.0 | 400.0 | 400.0 | 400.0 | 250.0 | 250.0 | -600.0 | -250.0 | -250.0 | 3,250.0 |
| ⟩ Financing Proceeds ⋯ | 1,500.0 | 1,500.0 | 1,800.0 | 1,500.0 | 1,500.0 | 1,800.0 | 1,600.0 | 1,600.0 | 1,600.0 | 1,600.0 | 1,600.0 | 1,600.0 | 19,200.0 |
| | 250.0 | 600.0 | 400.0 | 400.0 | 400.0 | 400.0 | 1,000.0 | 250.0 | 250.0 | 600.0 | 250.0 | 250.0 | 5,050.0 |
| ⟩ Asset Sales ⋯ | 1,500.0 | 1,500.0 | 1,800.0 | 1,500.0 | 1,500.0 | 1,800.0 | 1,600.0 | 1,600.0 | 1,600.0 | 1,600.0 | 1,600.0 | 1,600.0 | 19,200.0 |
| | 600.0 | 600.0 | 400.0 | 400.0 | -1,00.0 | -250.0 | 600.0 | 600.0 | 250.0 | 250.0 | -400.0 | 600.0 | 2,650.0 |
| ⟩ Transfers ⋯ | 1,500.0 | 1,500.0 | 1,800.0 | 1,500.0 | 1,500.0 | 1,800.0 | 1,600.0 | 1,600.0 | 1,600.0 | 1,600.0 | 1,600.0 | 1,600.0 | 19,200.0 |
| | 400.0 | 1,000.0 | 600.0 | 400.0 | 400.0 | 600.0 | 250.0 | 250.0 | -600.0 | -1,000.0 | -250.0 | -250.0 | 1,800.0 |

| | | Show comparison as ○ Values ● Difference | | | | | | | | | | | 2022 FY 2022 retail Construction ⊕ | |
|---|---|---|---|---|---|---|---|---|---|---|---|---|---|---|
| | | Jan 2020 | Feb | Mar | Apr | May | Jun | Jul | Aug | Sep | Oct | Nov | Dec | Total |
| ∨ Inflows | | | | | | | | | | | | | | |
| > Sales & Income | ... | 1,500.0 | 1,500.0 | 1,800.0 | 2,800.0 | 1,500.0 | 1,800.0 | 1,600.0 | 1,600.0 | 1,600.0 | 5,000.0 | 1,600.0 | 1,600.0 | 19,200.0 |
| | | 1,000.0 | 250.0 | 1,000.0 | 400.0 | 400.0 | 400.0 | 400.0 | 250.0 | 250.0 | -600.0 | -250.0 | -250.0 | 3,250.0 |
| > Financing Proceeds | ... | 1,500.0 | 1,500.0 | 1,800.0 | 1,500.0 | 1,500.0 | 1,800.0 | 1,600.0 | 1,600.0 | 1,600.0 | 1,600.0 | 1,600.0 | 1,600.0 | 19,200.0 |
| | | 250.0 | 600.0 | 400.0 | 400.0 | 400.0 | 400.0 | 1,000.0 | 250.0 | 250.0 | 600.0 | 250.0 | 250.0 | 5,050.0 |
| > Asset Sales | ... | 1,500.0 | 1,500.0 | 1,800.0 | 1,500.0 | 1,500.0 | 1,800.0 | 1,600.0 | 1,600.0 | 1,600.0 | 1,600.0 | 1,600.0 | 1,600.0 | 19,200.0 |
| | | 600.0 | 600.0 | 400.0 | 400.0 | -1,000.0 | -250.0 | 600.0 | 600.0 | 250.0 | 600.0 | -400.0 | 250.0 | 2,650.0 |
| > Transfers | ... | 1,500.0 | 1,500.0 | 1,800.0 | 1,500.0 | 1,500.0 | 1,800.0 | 1,600.0 | 1,600.0 | 1,600.0 | 1,600.0 | 1,600.0 | 1,600.0 | 19,200.0 |
| | | 400.0 | 1,000.0 | 600.0 | 400.0 | 400.0 | 600.0 | 250.0 | 250.0 | -600.0 | -1,000.0 | -250.0 | 600.0 | 1,800.0 |
| > Miscellaneous | ... | 1,500.0 | 1,500.0 | 1,800.0 | 1,500.0 | 1,500.0 | 1,800.0 | 1,600.0 | 1,600.0 | 1,600.0 | 1,600.0 | 1,600.0 | 1,600.0 | 19,200.0 |
| | | 600.0 | 400.0 | 400.0 | 250.0 | 250.0 | 1,000.0 | -250.0 | -1,000.0 | -1,000.0 | -1,000.0 | -250.0 | -250.0 | -850.0 |

FIG. 5

SYSTEM AND A METHOD FOR FACILITATING FINANCIAL PLANNING

BACKGROUND OF THE INVENTIONS

1. Field of the Inventions

The present inventions generally relates to a system for comparing data sets using heat maps, and more particularly relates a system and a method for facilitating financial planning.

2. Description of Related Art

Financial planning is well-known and readily appreciated by those of skill in the art. Financial planning is generally done on either monthly or yearly basis. Financial planning is done by comparing previous year financial data and for the next year financial data. Various softwares are available in the market to create financial plan of current and future financial state including cash flow, assets and withdrawal plans.

These softwares generally include static charts or graphs to display financial plan. A chart or graph is described in Wikipedia as a type of information graphic or graphic organizer that represents tabular numeric data and/or functions. Charts are often used to make it easier to understand large quantities of data and the relationship between different parts of the data.

Charts such as heat map are also used to represent data. Heatmap is a graphical representation of data where values are depicted by color. Heat maps make it easy to visualize complex data and understand it at a glance. A heat map is an abstract representation of correspondence between two data sets. Heat maps are often employed to compare and analyze categorical data. The heat map consists of a rectangular tiling with each tile shaded on a color scale to represent the value of the corresponding element of the data matrix.

Identification of patterns formed via variations and clusters of data points in a heat map (e.g., often rendered as pixels of a digital image representation of the heat map) can reveal various correlations between data sets. The patterns formed in a heat map and the techniques for identifying such patterns are dependent on the type of data represented by the matrices and the manner in which the data is organized, filtered and arranged.

The heat maps are generally static and showcase the pre-programmed data. However, none of the systems known in the art discloses dynamic heat maps used to compare data. Therefore, there is a need of a system and a method for facilitating financial planning utilizing dynamic heat maps. The system and the method should allow a user to set a variable threshold value to set a degree of difference.

SUMMARY OF THE INVENTIONS

In accordance with teachings of the present inventions, a system for facilitating financial planning of an objective is provided.

An object of the present inventions is to provide the system with a storage unit for storing plurality of modules, a display unit for displaying processed plurality of modules, a processing unit is coupled to the storage unit and the display unit for processing the plurality of modules. The plurality of modules includes a data input module, a data category display module, a threshold module, a slide module and a heat map module.

Another object of the present inventions is to provide the heat map module with a color module to display the degree of difference with the intensity of the color. A red color to display the degree of difference for a negative value and a green color to display the degree of difference for a positive value. The color module displays variation in the intensity of the red or green color based on the degree of difference between the two financial data sets.

Another object of the present inventions is to provide the plurality of modules with a curve distribution module to allow a user to input the financial data sets through curve graphs. Further the curve distribution module allows the user to modify the distribution of the financial data sets through the curve graphs. Further the curve distribution module allows the user to modify the distribution of the financial data sets through the curve graphs and to use a previous year's data to define the distribution curve.

Another object of the present inventions is to provide plurality of modules with a scenario module for allowing a user to input one or more scenarios related to the financial planning of the objective, and an adjustment module for allowing a user to adjust scope of the financial data set displayed in correspondence with the values associated with an activity. The activity is associated with the pre-defined scenario.

While a number of features are described herein with respect to embodiments of the inventions; features described with respect to a given embodiment also may be employed in connection with other embodiments. The following description and the annexed drawings set forth certain illustrative embodiments of the inventions. These embodiments are indicative, however, of but a few of the various ways in which the principles of the inventions may be employed. Other objects, advantages, and novel features according to aspects of the inventions will become apparent from the following detailed description when considered in conjunction with the drawings.

BRIEF DESCRIPTION OF THE INVENTIONS

The annexed drawings, which are not necessarily to scale, show various aspects of the inventions in which similar reference numerals are used to indicate the same or similar parts in the various views.

FIG. 3 illustrates a screenshot showing of a data category display module in accordance with an exemplary embodiment of the present inventions;

FIG. 5 illustrates a heat map module showing of a heat map module in accordance with an exemplary embodiment of the present inventions;

DETAILED DESCRIPTION OF DRAWINGS

Figure 1:
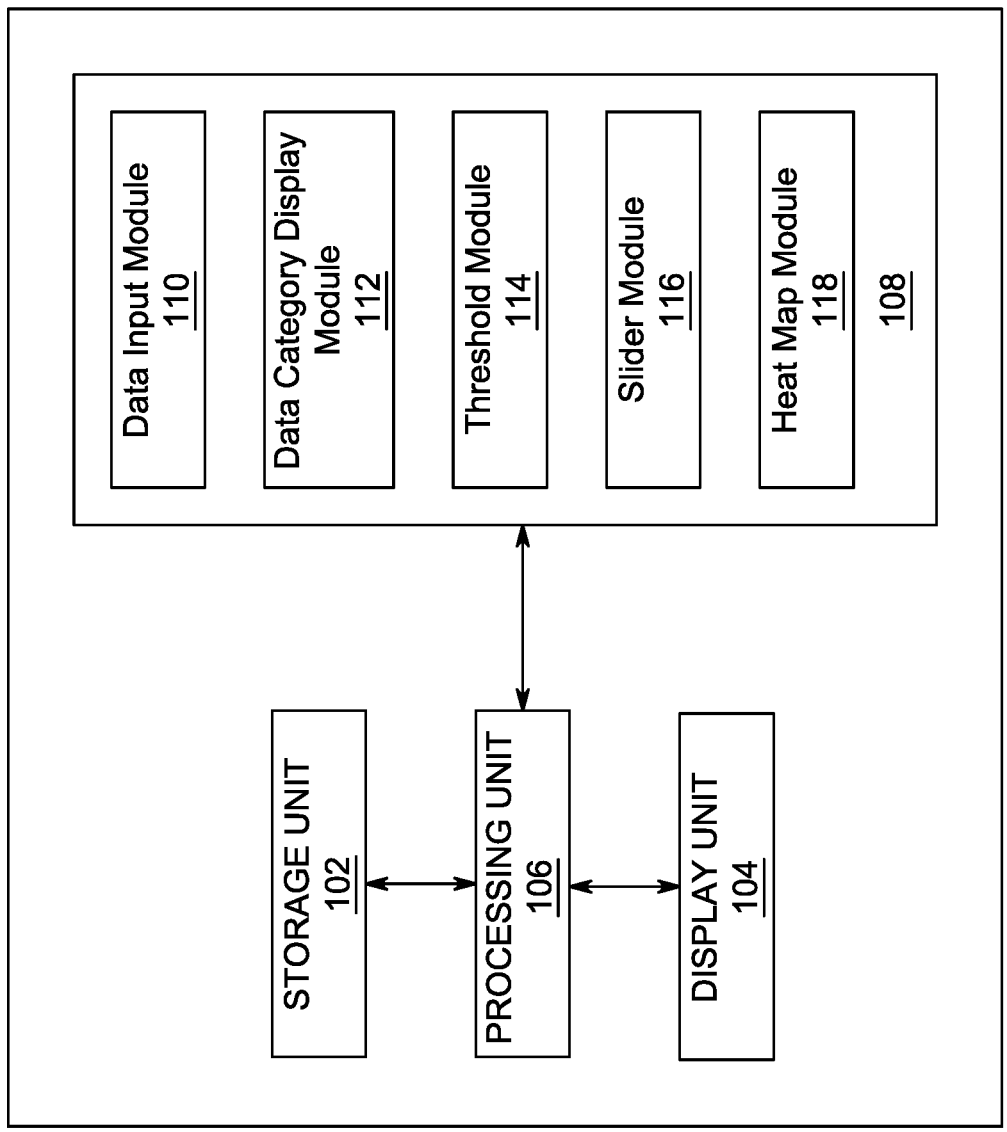
FIG. 1 illustrates a block diagram of a system for facilitating financial planning of an objective.

The present disclosure is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

FIG. 1 illustrates a block diagram of a system 100 for facilitating financial planning of an objective. The system 100 includes a storage unit 102, a display unit 104 and a processing unit 106. The storage unit 102 stores computer program instructions (hereinafter referred to as plurality of modules 108). The display unit 104 displays processed plurality of modules 108. The processing unit 106 is coupled to the plurality of modules 108.

Examples of the storage unit 102 and the processing unit 106 include but not limited to include but not limited to microprocessors, microcontrollers, controllers, SQL Server, Oracle Database, Sybase, Informix, a cloud server, a content providing server, and an application providing server, and MySQL. Examples of the display unit 104 include but not limited to LED, OLED, computer screen, phone displays, LCD, and any other similar devices etc.

Each computer program instruction is interchangeably used as a module throughout the 'detailed description of drawings'. The plurality of modules 108 includes a data input module 110, a data category display module 112, a threshold module 114, a slider module 116, and a heat map module 118. The data input module 110 receives at least one category and plurality of financial data set associated with each category.

The data category display module 112 is coupled to the data input module 110 for displaying at least two sets of the financial data sets associated with the category. The data input module 110 and the data category display module 112 are explained in detail in conjunction with FIG. 2 and FIG. 3 of the present inventions.

The threshold module 114 stores a threshold value associated with each category. The threshold value is a degree of difference between the two financial data sets. The slider module 116 allows a user to move the slider to control the threshold value. The threshold module 114 and the slider module 116 are explained in detail in conjunction with FIG. 4 of the present inventions.

Figure 2:
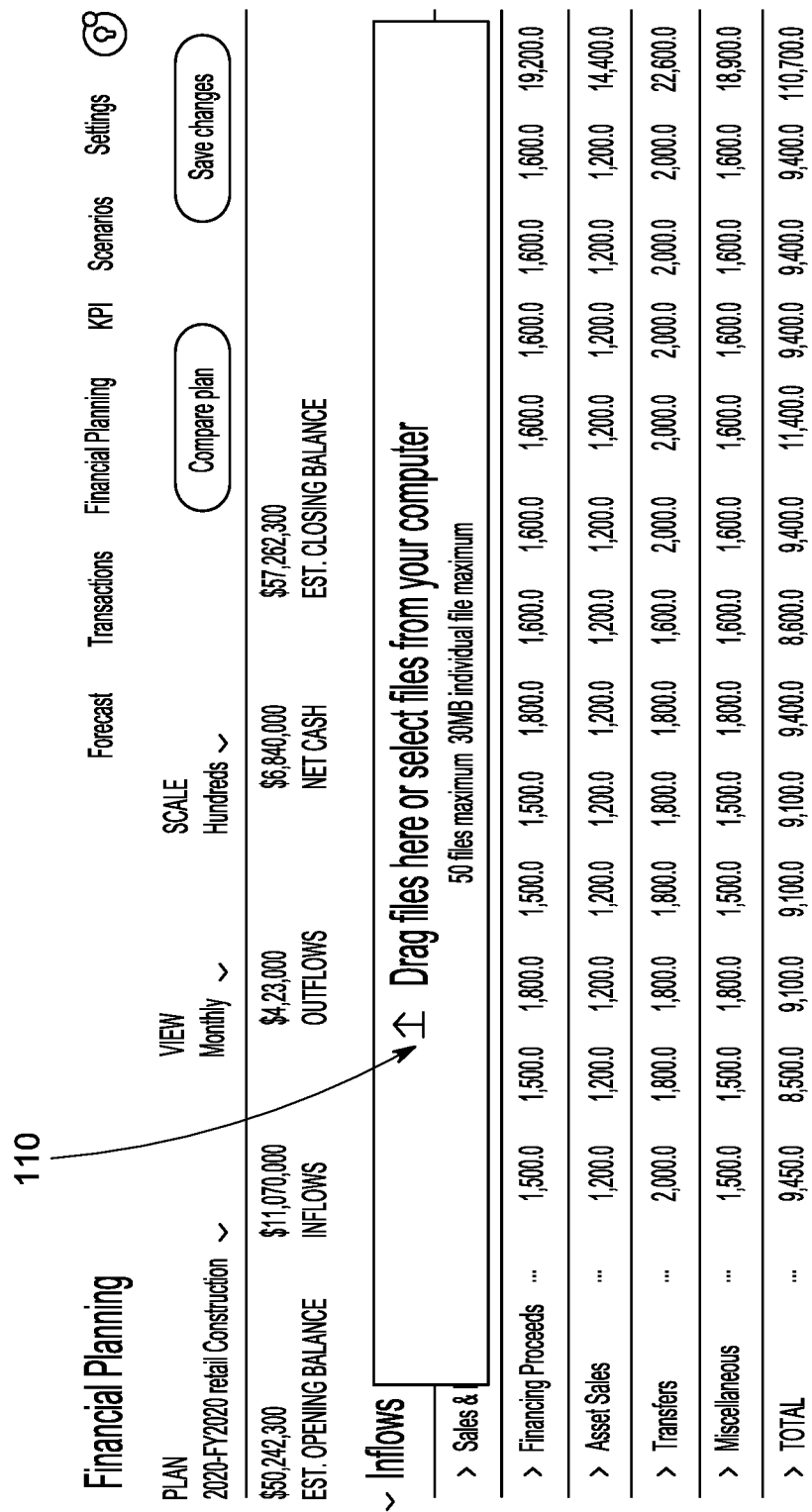
FIG. 2 illustrates a screenshot showing of a data input module in accordance with an exemplary embodiment of the present inventions.

The heat map module 118 is coupled to the slider module 116 for displaying the degree of difference between the two financial data sets based on the threshold value selected through the slider module. The heat map module 118 is explained in detail in conjunction with FIG. 5 of the present inventions. FIG. 2 illustrates a screenshot showing of a data input module 110 in accordance with an exemplary embodiment of the present inventions. The data input module 110 allows the user to either 'drag files' or 'select files from your computer' to input data. The data may be inputted through excel, word, pdf, or and any other similar document/file format.

Alternatively, the data may be input directly into the cells by the users. The data relates at least one category and plurality of financial data set associated with each category. Examples of the financial data set and the category is explained in detail in conjunction with FIG. 3 of the present inventions.

FIG. 3 illustrates a screenshot showing of a data category display module 112 in accordance with an exemplary embodiment of the present inventions. The data category display module 112 displays at least two sets of the financial data sets 304 associated with each category 302.

For exemplary purposes as shown in FIG. 3, for the category Sales & Income, the financial data set for January 1500 and 1000, for February 1500 and 250, for March 1800 and 1000 etc. Similarly examples of other category include but not limited to financing proceeds, asset sales and transfers. It would be readily apparent to those skilled in the art that various types of category and financial data sets may be envisioned without deviating from the scope of the present inventions.

Figure 4:
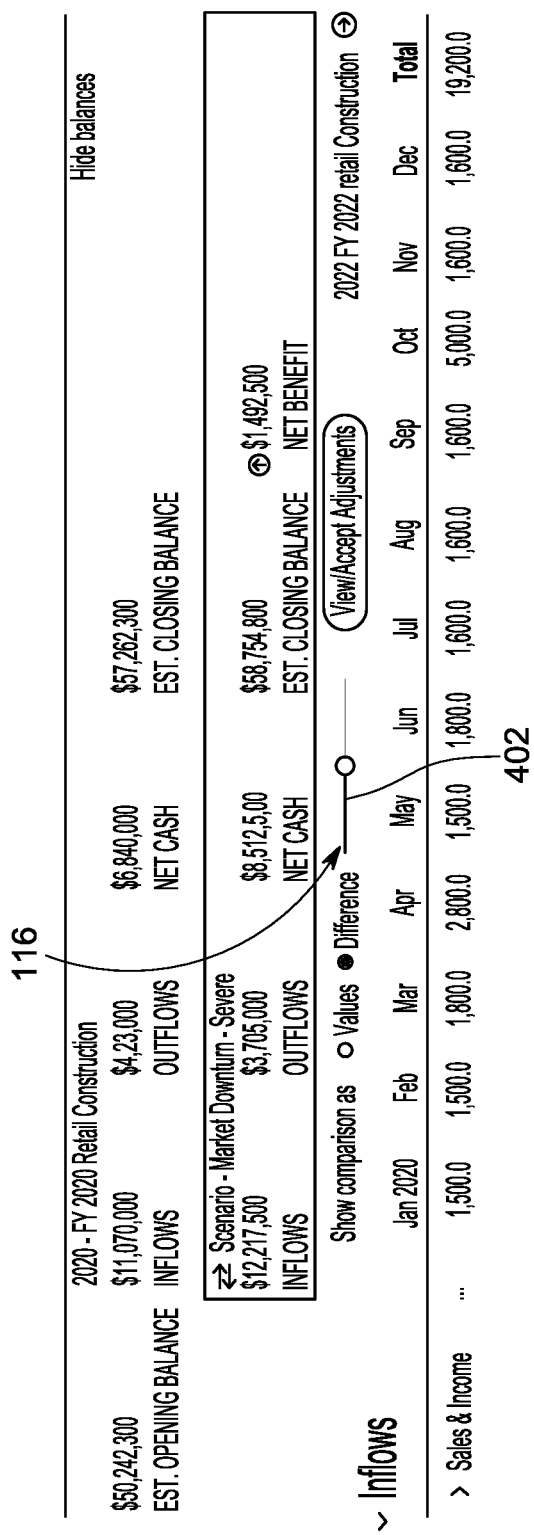
FIG. 4 illustrates a screenshot showing of a slider module in accordance with an exemplary embodiment of the present inventions.

FIG. 4 illustrates a screenshot showing of a slider module 116 in accordance with an exemplary embodiment of the present inventions. The slider module 116 allows the user to move the slider 402 to control the threshold value. In a preferred embodiment, the slider 402 may be moved left and right to control the degree of difference between the two financial data sets for each category.

It would be readily apparent to those skilled in the art that many possible variations such as circular sider, diagonal slider of the slider module 116 may be envisioned without deviating from the scope of the present inventions. The slider module 116 is coupled with the threshold module 114.

The threshold module (114, shown in FIG. 1) runs at the backend, where the user decides the degree of difference. The threshold value may be a number or a range or percentage. For exemplary purposes, if the degree of difference is more than 100 units then the color would be pop up in the heat map module (118, shown in FIG. 1). The heat map module (118, shown in FIG. 1) is further explained in detail in conjunction with FIG. 5 of the present inventions.

FIG. 5 illustrates a heat map module 118 showing color variations in accordance with an exemplary embodiment of the present inventions. The heat map module 118 displays the degree of difference between the two financial data sets with color variation based on the threshold value selected through the slider module 116.

For exemplary purposes, the degree of difference between two financial data sets to be shown as:

Top 25% difference (175-200 units)=darker red/green
Next to top 25% difference (150-175 units)=medium-dark red/green
Lower 25% difference (125-150 units)=medium red/green
Lowest 25% difference (100-125 units)=light red/green In another embodiment of the present inventions, the heat map module 118 further includes a color module 502 to display the degree of difference with the intensity of the color. For exemplary embodiment, Dark Green color indicates that the difference is higher positive values, light green color indicates that the difference is lower positive value, the dark red color indicates that the difference is a higher negative value and the light red color indicates that the difference is lower negative value.

Figure 6:
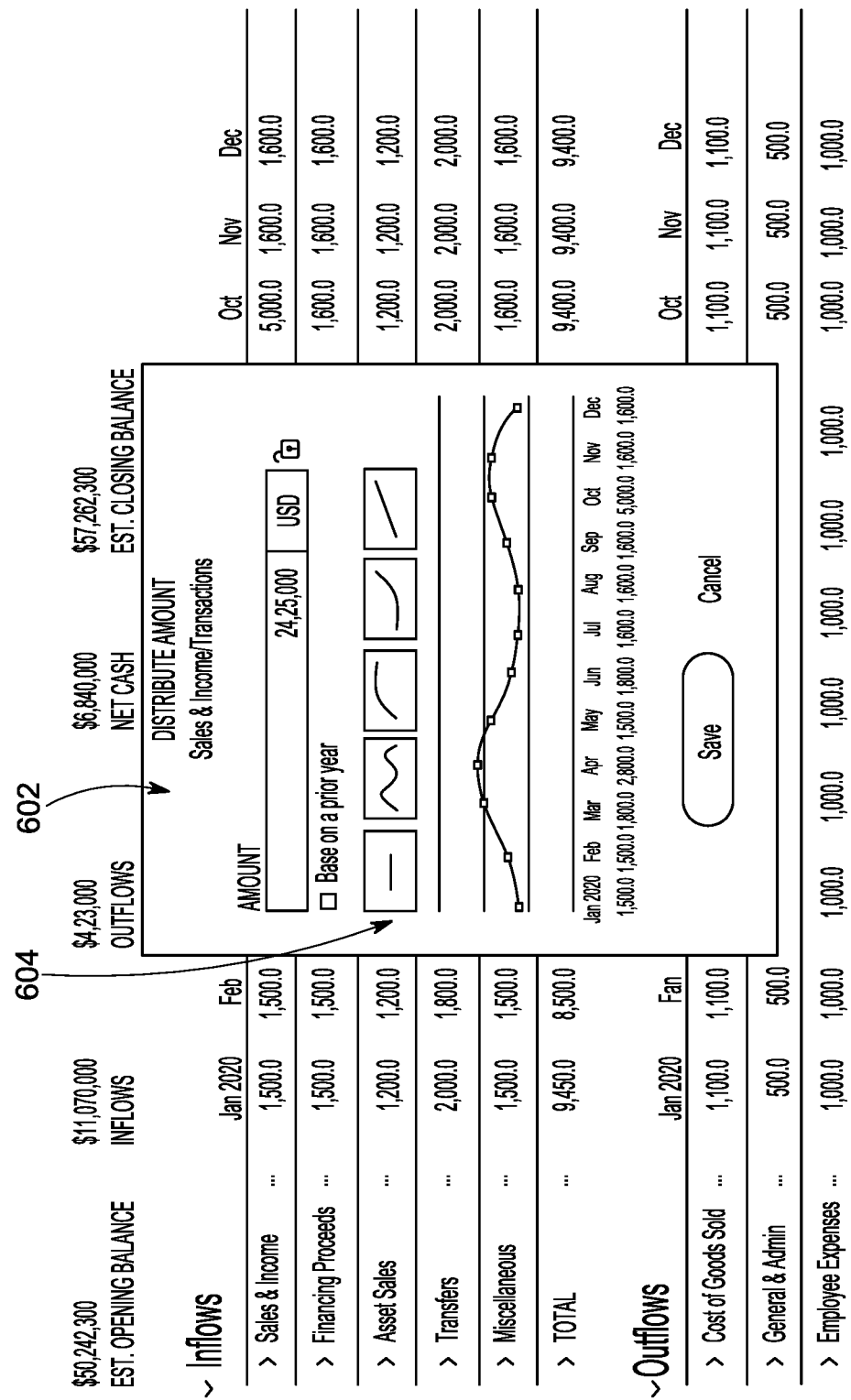
FIG. 6 illustrates a screenshot showing of a curve distribution module for allowing a user to input/distribute financial data sets through the curve graphs.

It would be readily apparent to those skilled in the art that various color schemes and intensity levels may be envisioned without deviating from the scope of the present inventions. FIG. 6 illustrates a screenshot showing of a curve distribution module 602 for allowing a user to input/ distribute financial data sets through the curve graphs 604. In another embodiment of the present invention, the system further includes a curve distribution module 602 for allowing the user to use a pre-defined curve shapes for inputting financial data sets.

The curve distribution module 602 receives input of data through pre-defined curve graphs 604. The user is able to select one curve graph that matches with the financial data set. Further, the user is able to modify/distribute the curve graph to adjust the financial data set according to their requirements.

Figure 7:
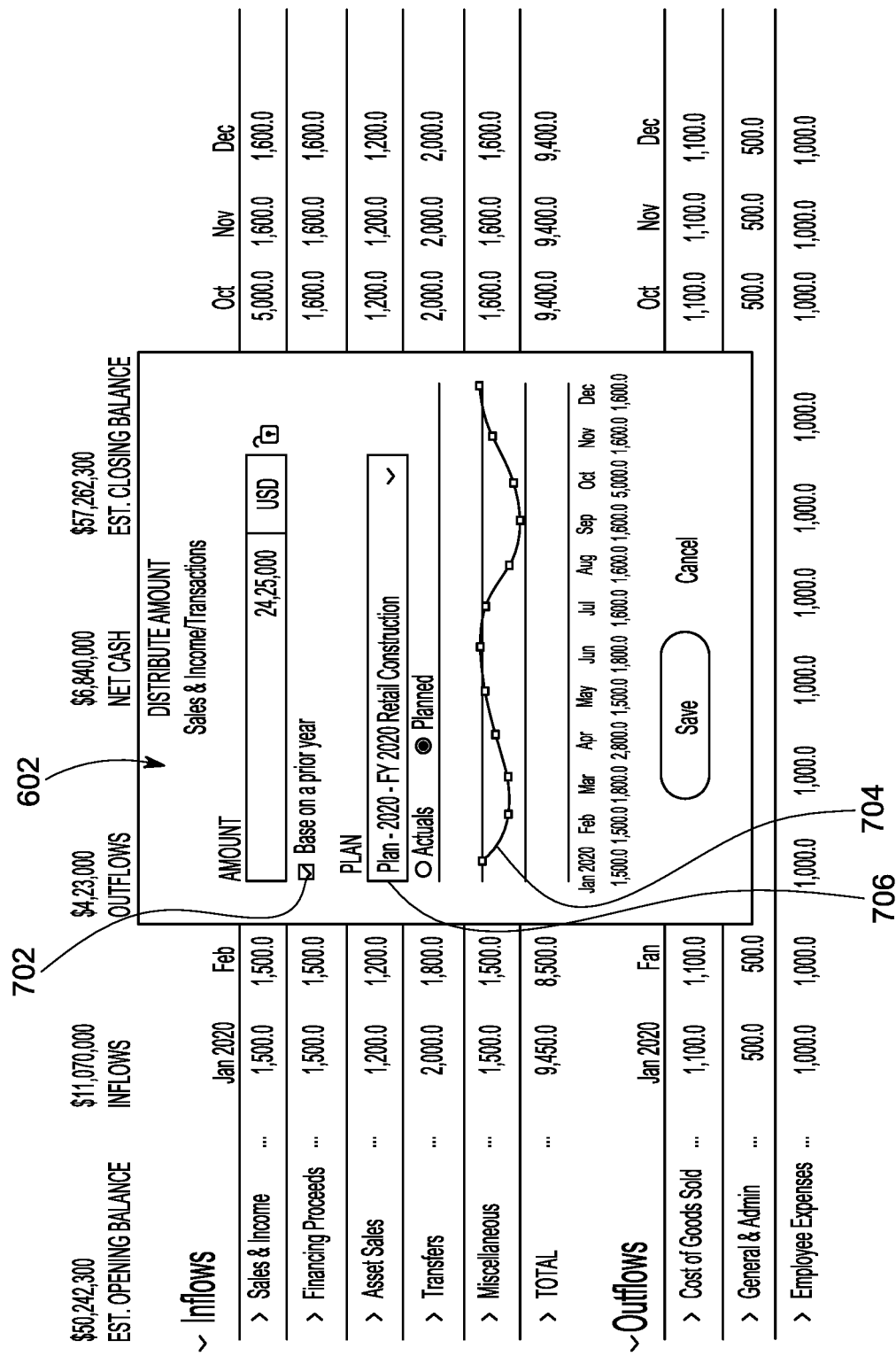
FIG. 7 illustrates a screenshot showing of a curve distribution module for allowing a user to use a previous year's data to define the distribution curve.

FIG. 7 illustrates a screenshot showing of a curve distribution module 602 for allowing a user to use a previous year's 702 data to define the distribution curve. For exemplary purposes, the curve graph 704 represents a plan for '2020-FY-2020 Retail Construction' 706. The user is able to use the graph 704 as a basic template for representing the financial data sets.

Figure 8:
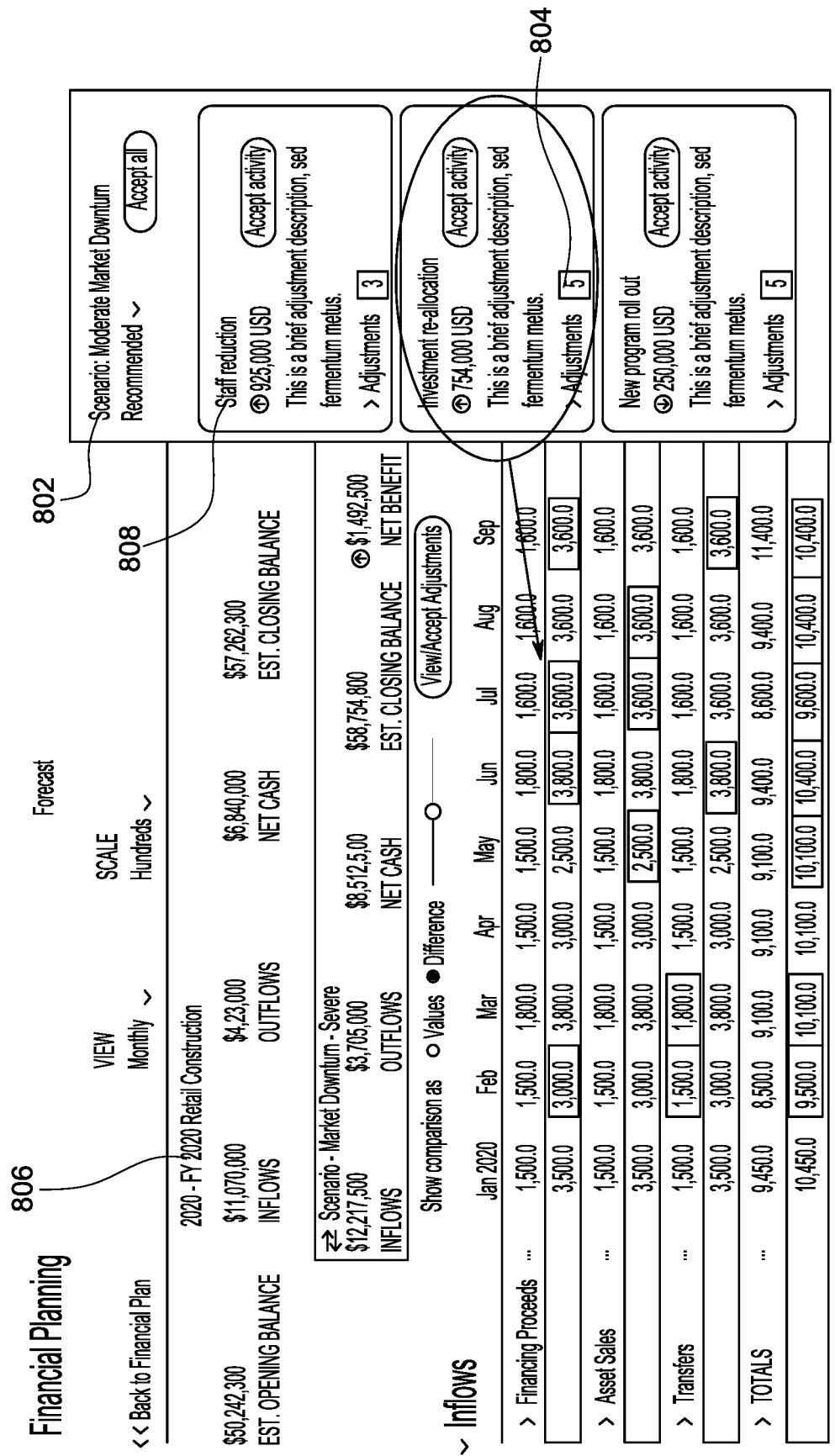
FIG. 8 illustrates a screenshot showing of a scenario module and an adjustment module in accordance with an exemplary embodiment of the present inventions.

FIG. 8 illustrates a screenshot showing of a scenario module 802 and an adjustment module 804 in accordance with an exemplary embodiment of the present inventions. The scenario module 802 allows the user to input one or more scenarios related to the financial planning of the objective 806. In a preferred embodiment, the objective 806 is financial planning of a retail construction. It would be readily apparent to those skilled in the art that various objective 806 may be envisioned without deviating from the scope of the present invention.

The scenario module 802 allows the user to input one or more scenarios related to the financial planning of the objective. Examples of the scenarios include but not limited to 'moderate market downturn'. The adjustment module 804 for allowing the user to adjust scope of the financial data set displayed in correspondence with the values associated with an activity 808.

The activity 808 is associated with the pre-defined scenario. Examples of the activity 808 include but not limited to staff reduction, investment re-allocation, new program roll out etc. The activity 808 suggests possible adjustments to adjust scope of the financial data set.

In another preferred embodiment of the present invention though not shown in FIGURES, a method for facilitating financial planning of an objective. The method comprising the steps (algorithm) defined in the system (100, shown in FIG. 1). The method may be implemented using a computer. The system (100, shown in FIG. 1) is an electronic data processing apparatus e.g. be one or more programmed computational devices, e.g. like a PC, laptop, computer, server, smart-phone, tablet, etc. and is specially programmed to carry out or execute the computer-implemented method(s) and embodiments thereof as described throughout the specification and variations thereof.

It should be appreciated that many of the elements discussed in this specification may be implemented in a hardware circuit(s), a circuitry executing software code or instructions which are encoded within computer readable media accessible to the circuitry, or a combination of a hardware circuit(s) and a circuitry or control block of an integrated circuit executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a circuitry or control block executing code encoded in a computer readable media, or a combination of a hardware circuit(s) and a circuitry and/or control block executing such code.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the inventions have been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the inventions. In addition, while a particular feature of the inventions may have been described above with respect to only one or more of several illustrated embodiments, such feature may be combined with one or more other features of the other embodiments, as may be desired and advantageous for any given or particular application.

The invention claimed is:

1. A system for facilitating financial planning of an objective, the system comprising:

a storage unit for storing a plurality of computer program instructions;

a display unit for displaying a processed plurality of computer program instructions;

and a processing unit coupled to the storage unit and the display unit for processing the plurality of computer program instructions, wherein the plurality of computer program instructions comprising: data input computer program instructions for receiving at least one category and a plurality of financial data sets associated with each category;

data category display computer program instructions coupled to the data input computer program instructions for displaying at least two sets of the financial data sets associated with the at least one category;

threshold computer program instructions for storing a threshold value associated with each category, wherein the threshold value is a degree of difference between the at least two sets of the financial data sets;

slider computer program instructions for allowing a user to move a slider to control the threshold value;

heat map computer program instructions coupled to the slider computer program instructions for displaying the degree of the difference between the at least two sets of the financial data sets with a color variation based on the threshold value selected through the slider computer program instructions; and the plurality of computer program instructions further comprising a curve distribution computer program instructions coupled to the data input computer program instructions to allow a the user to input the financial data sets through curve graphs.

2. The system according to claim 1, wherein the heat map computer program instructions further comprising color computer program instructions to display the degree of the difference with an intensity of the color variation.

3. The system according to claim 2, wherein the color computer program instructions further comprising a red color to display the degree of the difference for a negative value.

4. The system according to claim 2, wherein the color computer program instructions further comprising a green color to display the degree of the difference for a positive value.

5. The system according to claim 3, wherein the color computer program instructions display variation in the intensity of the red color based on the degree of the difference between the at least two sets of the financial data sets.

6. The system according to claim 3, wherein the color computer program instructions display variation in the intensity of the red color based on the degree of the difference between the at least two sets of the financial data sets.

7. The system according to claim 1 wherein the curve distribution computer program instructions allow the user to distribute the financial data sets through the curve graphs.

8. The system according to claim 7 wherein the curve distribution computer program instructions allow the user to modify the distribution of the financial data sets through the curve graphs.

9. The system according to claim 1 wherein the curve distribution computer program instructions further allow the user to use a pre-defined curve shapes for inputting financial data sets.

10. The system according to claim 1 wherein the curve distribution computer program instructions further allow the user to uses use a previous year's data to define the a distribution curve.

11. The system according to claim 1 wherein the plurality of computer program instructions further comprising scenario computer program instructions for allowing the user to input one or more scenarios related to the financial planning of the objective.

12. The system according to claim 9 further comprising adjustment computer program instructions for allowing the user to adjust a scope of the financial data set displayed in correspondence with the values associated with an activity, wherein the activity is associated with a pre-defined scenario.

13. A method for facilitating financial planning of an objective, the method comprising steps of:
storing a plurality of computer program instructions via a storage unit;
displaying a processed plurality of computer program instructions; processing plurality of computer program instructions using a processing unit;
receiving at least one category and a plurality of financial data sets associated with each category via data input computer program instructions;
displaying at least two sets of the financial data sets associated with the at least one category via a data category display computer program instructions;
storing a threshold value associated with each category, wherein the threshold value is a degree of difference between the at least two sets of the financial data sets via threshold computer program instructions; allowing a user to move the a slider to control the threshold value via slider computer program instructions;
displaying the degree of the difference between the at least two sets of the financial data sets with color variation based on the threshold value selected through the slider computer program instructions via heat map computer program instructions; and
the plurality of computer program instructions further comprising a curve distribution computer program instructions coupled to the data input computer program instructions to allow a the user to input the financial data sets through curve graphs.

14. The method according to claim 13 wherein the heat map computer program instructions further comprising color computer program instructions to display the degree of the difference with an intensity of the color.

15. The method according to claim 13 further comprising a step of allowing the user to use a previous year's data to define a distribution curve via curve distribution computer program instructions.

16. The method according to claim 13 further comprising a step of allowing the user to input one or more scenarios related to the financial planning of the objective via scenario computer program instructions.

17. The method according to claim 13 further comprising a step of allowing the user to adjust a scope of the financial data set displayed in correspondence with values associated with an activity, wherein the activity is associated with a pre-defined scenario via adjustment computer program instructions.

18. The method according to claim 15 wherein the curve distribution computer program instructions allow the user to modify the distribution of the financial data sets through curve graphs.

* * * * *